(12) United States Patent
Ray et al.

(10) Patent No.: US 12,117,588 B2
(45) Date of Patent: Oct. 15, 2024

(54) SYSTEM AND METHOD FOR USING MECHANICAL LOADING TO CREATE SPATIALLY PATTERNED META SURFACES FOR OPTICAL COMPONENTS

(71) Applicant: Lawrence Livermore National Security, LLC, Livermore, CA (US)

(72) Inventors: Nathan James Ray, Tracy, CA (US); Eyal Feigenbaum, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 474 days.

(21) Appl. No.: 17/561,627

(22) Filed: Dec. 23, 2021

(65) Prior Publication Data

US 2023/0204820 A1 Jun. 29, 2023

(51) Int. Cl.
*G02B 1/00* (2006.01)
*B82Y 40/00* (2011.01)
*B82Y 20/00* (2011.01)

(52) U.S. Cl.
CPC .............. *G02B 1/002* (2013.01); *B82Y 20/00* (2013.01); *B82Y 40/00* (2013.01)

(58) Field of Classification Search
CPC .......... G02B 1/00; B82Y 40/00; G03F 7/0002
See application file for complete search history.

(56) References Cited

U.S. PATENT DOCUMENTS

2013/0139713 A1 6/2013 Cho et al.
2023/0118541 A1* 4/2023 Quaade ................ B29C 59/026
264/447

FOREIGN PATENT DOCUMENTS

WO 2021197677 A1 10/2021

OTHER PUBLICATIONS

Cai, et al. "Recent Advances in Antireflective Surfaces Based on Nanostructure Arrays," Mater. Horiz. 2, 37-53 (2015).
Infante, et al. "Durable, Superhydrophobic, Antireflection, and Low Haze Glass Surfaces Using Scalable Metal Dewetting Nanostructuring," Nano Res. 6, 429-440 (2013).
Huang, et al. "Fabrication of GaN-based nanorod light emitting diodes using self-assemble nickel nano-mask and inductively coupled plasma reactive ion etching," Materials Science and Engineering B 113, 125-129 (2004).

(Continued)

*Primary Examiner* — Ryan D Howard
(74) *Attorney, Agent, or Firm* — HARNESS, DICKEY & PIERCE, P.L.C.

(57) ABSTRACT

The present disclosure relates to a system for producing a patterned nanostructured surface on a component from a pre-existing, nanostructured surface with a first spatial feature distribution on the component. The system makes use of a force application element configured to apply a force to the pre-existing, nanostructured surface, and a force application control subsystem. The force application control subsystem is configured to control elevational movement of the force application element along a first axis of movement into and out of contact with the pre-existing, nanostructured surface to apply a predetermined load to the pre-existing, nanostructured surface. The predetermined load is sufficient to modify the pre-existing, non-patterned nanostructured surface to create the patterned nanostructured surface.

20 Claims, 6 Drawing Sheets

(56) References Cited

OTHER PUBLICATIONS

Yoo, et al. "Scalable Light-Printing of Substrate-Engraved Free-Form Metasurfaces," ACS Appl. Mater. Interfaces 11, 22684-22691 (2019).

Ray et al. "Enhanced Tunability of Gold Nanoparticle Size, Spacing, and Shape for Large-Scale Plasmonic Arrays," ACS Appl. Nano Mater. 2, 4395-4401, (2019).

Ray, et al. "Substrate-engraved antireflective nanostructured surfaces for high-power laser applications," Optica, vol. 7, No. 5, 2020, pp. 518-526.

International Search Report and Written Opinion of the International Search Authority for corresponding International Application No. PCT/US2022/047354 mailed Jul. 19, 2023.

* cited by examiner

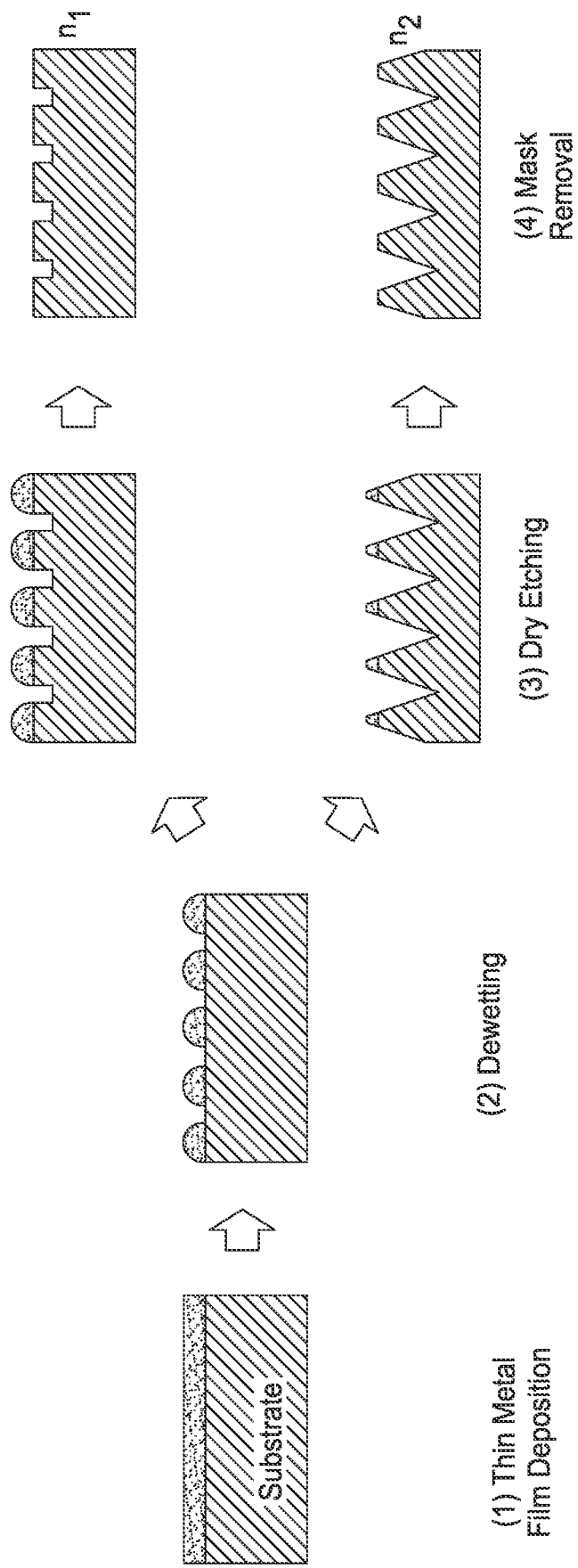

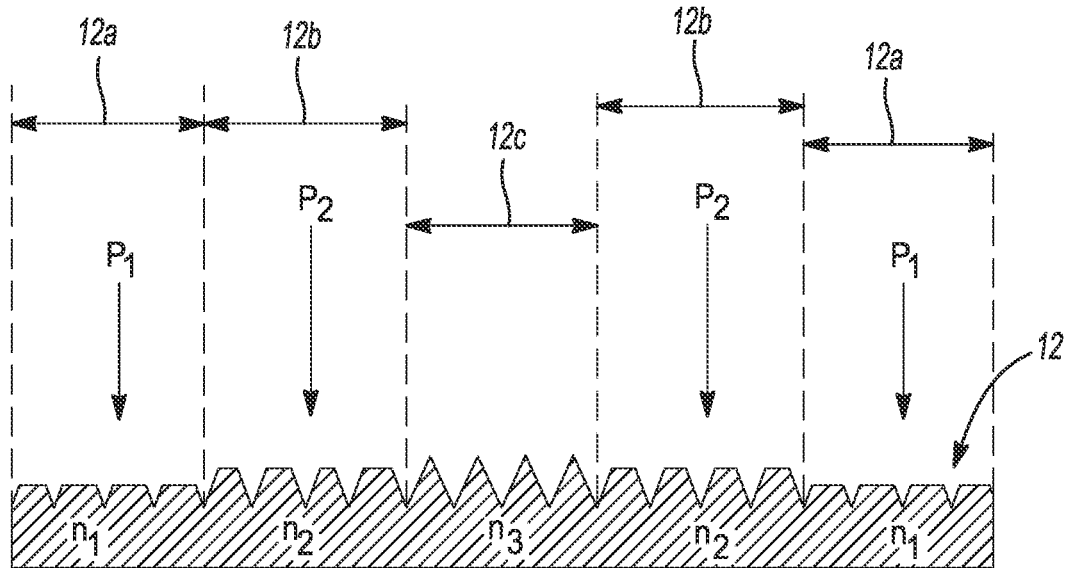
FIG. 2a
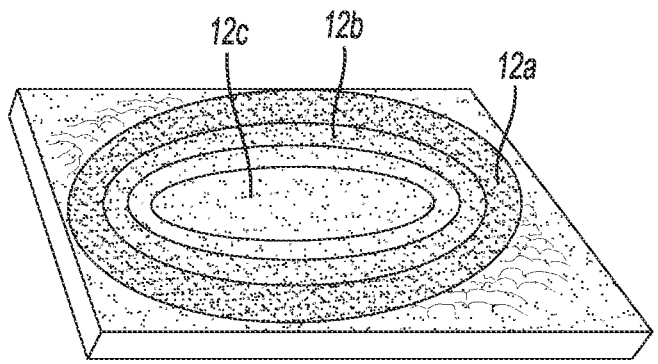
FIG. 2b
FIG. 2c
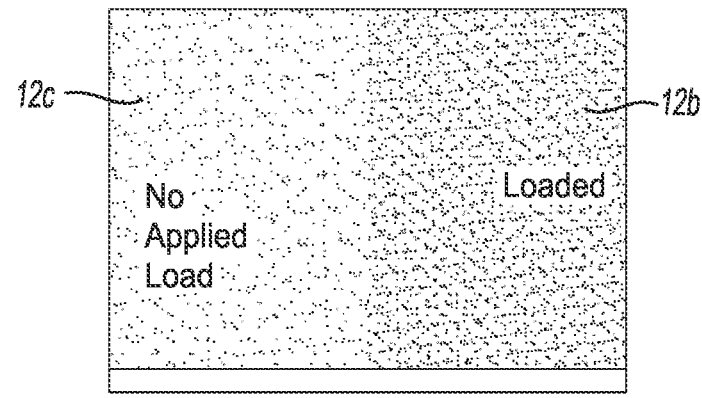

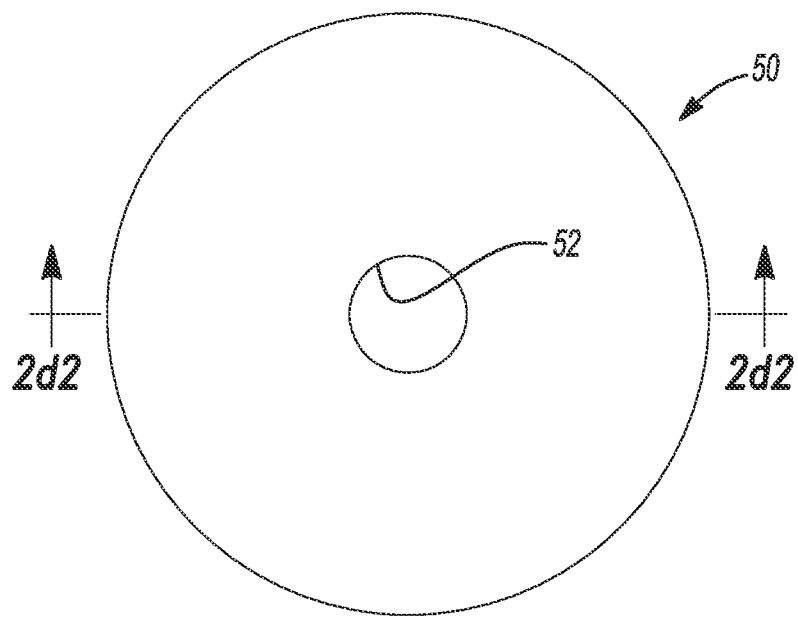
FIG. 2d1
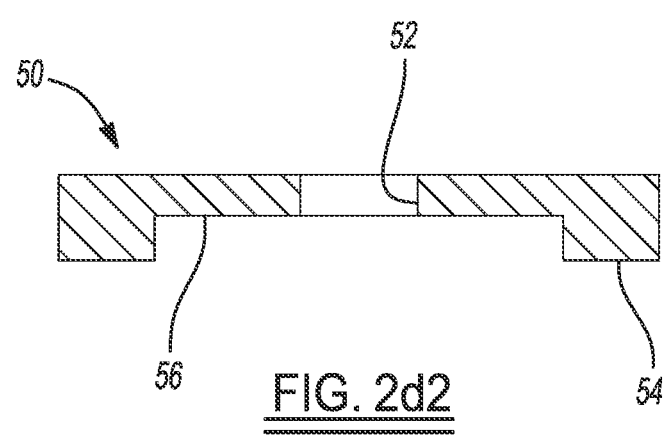
FIG. 2d2

SYSTEM AND METHOD FOR USING MECHANICAL LOADING TO CREATE SPATIALLY PATTERNED META SURFACES FOR OPTICAL COMPONENTS

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to metasurfaces used as optical components, and more particularly to systems and methods which involve the use of a controlled force applied to a metasurface of an optical component to spatially modify the metasurface in an engineered manner.

BACKGROUND

The statements in this section merely provide background information related to the present disclosure and may not constitute prior art.

Thin optics are highly desirable for high power laser systems, benefiting from the minimization of light propagation through the bulk medium which reduces laser damaging (for example, filamentation in the bulk material). Metaoptics, or components in which the optical properties are controlled by subwavelength features decorating the surface of the optic rather than the material composition of the optic itself, can be used for thin lens fabrication, aberration correction, specialized gratings, and more generally flat 'freeform' optics. An existing implementation is to substrate-engrave the nanoscale features that form a metaoptic. Being monolithic to the substrate (i.e., no additional materials and interfaces) makes it very durable, that is, highly resistant to the environment, to laser fluence, and to thermal exposure.

An effective fabrication method for forming scalable, substrate-engraved metasurfaces, which is critical for powerful laser systems requiring both large aperture compatibility and durability, is a four-step process illustrated in FIGS. 1a-1d. FIGS. 1a-1d show for different etching times: (1) deposit a thin metal film "F" on the substrate (i.e., the optical element to be engraved with a substrate engraved metasurface (SEMS")), as shown in FIG. 1a; (2) dewet the thin metal film via thermal annealing to transform the film into an ensemble of nanoparticles "NP", which is typically done in an oven, a furnace, or by a rapid thermal annealer, as shown in FIG. 1b; (3) dry etch through the metal particles that serve as a blocking mask for the etching ions, subsequently transferring the mask shape as a pattern "P" into the substrate, as shown in FIGS. 1c; and (4) removal of the mask as shown in FIG. 1d. The result of this fabrication process is a substrate with an engraved, i.e., patterned, surface. The effective index of refraction for this engraved layer is dependent upon the ratio of the substrate material to the void space; in other words, the metasurface features produce an effective index of refraction for the optic with a value that is determined by the nanoscale geometrical features of the SEMS. The two different metasurface configurations illustrated in FIG. 1d, although produced from the same mask illustrated in FIG. 1b, and the same etching procedure, may generate different indices of refraction due to the geometric differences produced by etching for different durations.

One limitation of the conventional 4-step process is the method by which the initial thin metal film is annealed. Invariant heating, such as in a furnace or rapid thermal annealer for easy processing of large aperture optics, generates a spatially invariant nanoparticle mask which translates into a spatially invariant index of refraction across the entire optic. While this does function as an antireflective coating, it does not contain index patterning for metaoptics.

SUMMARY

This section provides a general summary of the disclosure, and is not a comprehensive disclosure of its full scope or all of its features.

In one aspect the present disclosure relates to a system for producing a patterned nanostructured surface on a component from a pre-existing, nanostructured surface with a first spatial feature distribution on the component. The system may comprise a force application element configured to apply a force to the pre-existing, nanostructured surface with the first spatial feature distribution. A force application control subsystem may be included which is configured to control elevational movement of the force application element along a first axis of movement into and out of contact with the pre-existing, nanostructured surface to apply a predetermined load to the pre-existing, nanostructured surface sufficient to modify the pre-existing, nanostructured surface to create the patterned nanostructured surface.

In another aspect the present disclosure relates to a system for producing a patterned nanostructured surface on a component from a pre-existing, nanostructured surface with an initial spatial feature distribution on the component. The system may comprise a force application element configured to apply a force to the pre-existing, nanostructured surface, a force application subsystem and a position control subsystem. The force application subsystem is configured to control elevational movement of the force application element along a first axis of movement into and out of contact with the pre-existing, nanostructured surface to apply a predetermined load to the pre-existing, nanostructured surface sufficient to modify the pre-existing, nanostructured surface to create the patterned nanostructured surface. The position control subsystem moves at least one of the component or the force application element along at least one of X or Y axes while the force application element is applying the predetermined load to the pre-existing, nanostructured surface.

In still another aspect the present disclosure relates to a method for producing a patterned nanostructured surface on a component from a pre-existing, nanostructured surface with an initial spatial feature distribution on the component. The method may comprise positioning a force application element over the pre-existing, nanostructured surface, and moving the force application element along a first axis into contact with the pre-existing, nanostructured surface. The method may further include continuing to use the force application element to apply a predetermined load to the pre-existing, nanostructured surface sufficient to modify the pre-existing nanostructured surface to create the patterned nanostructured surface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIGS. 1a-1d are highly simplified cross sectional side views of a prior art method for forming a metasurface on a substrate;

FIGS. 2a-2c show high level side cross sectional views of a substrate where two different mechanical loads are applied to different regions of a nanostructured surface to compress the metasurface features vertically in this example, to thus produce a unique spatial pattern of the nanostructured surface;

FIG. 2d1 is a top plan view of one example of a template having a stepped lower surface for creating the metasurface shown in FIG. 2a;

FIG. 2d2 is a side cross sectional view of the template of FIG. 2d1 taken along section line 2d2-2d2;

DETAILED DESCRIPTION

Figure 3:
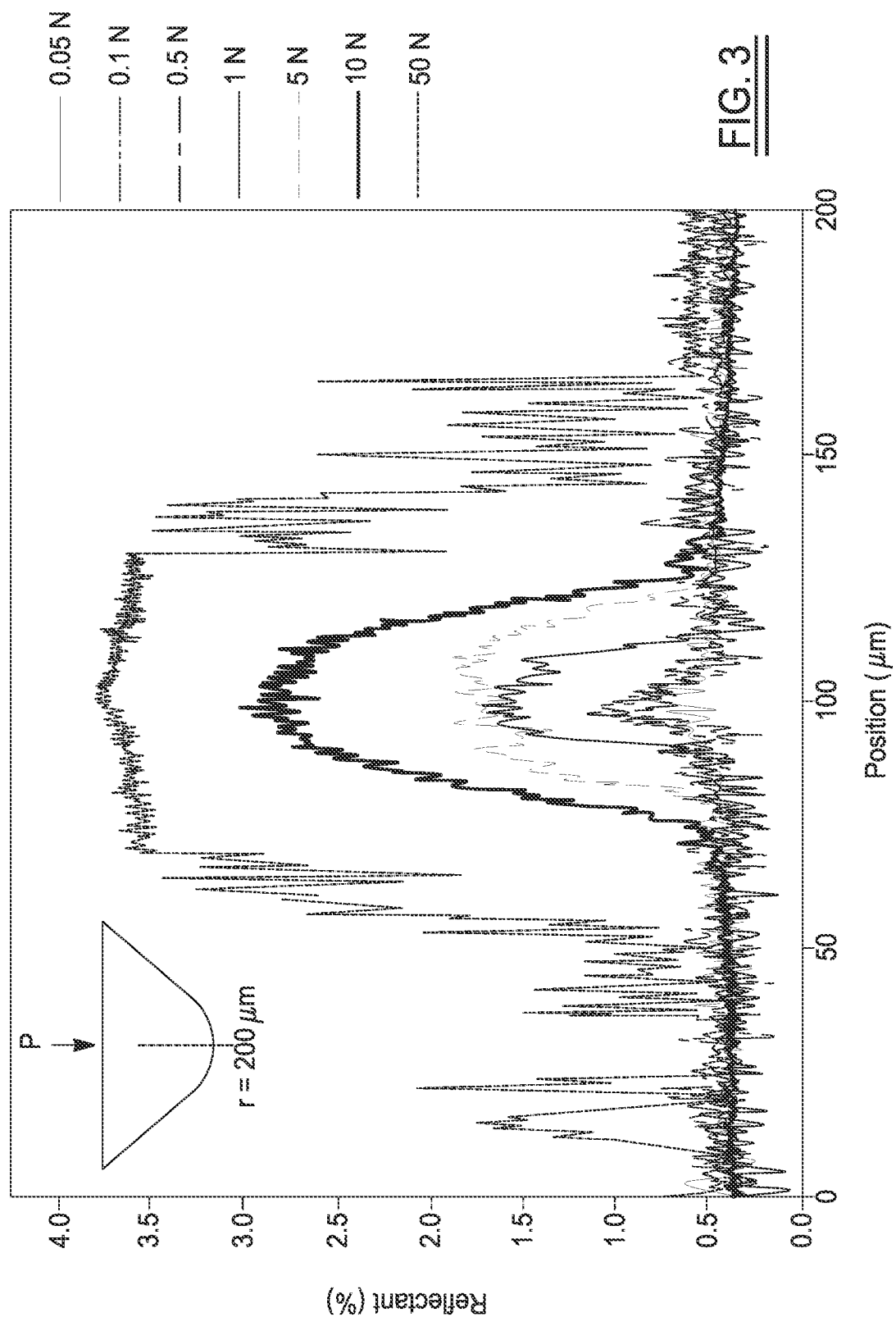
FIG. 3 is a graph showing a plurality of curves to indicate metasurface reflectance variations created following the application of different applied loads to the nanostructured features on a substrate.

Example embodiments will now be described more fully with reference to the accompanying drawings.

The present disclosure relates to systems and methods for patterning indices of refraction for substrate-engraved metasurfaces to generate flat optical components. Substrate-engraved metasurfaces are highly durable and scalable, and thus are decidedly relevant for high energy or high peak-power laser applications. An important aspect of the present disclosure is to mechanically load, in a spatially varied way, a nanostructured metasurface to change the geometric parameters of the metasurface features (e.g., feature height, lateral dimensions, and area fill fraction). In this manner one is able to subsequently change the optical and mechanical properties, such as the index of refraction and/or mechanical durability of the metasurface. It will be appreciated that laser raster scanning, as the source for thermal annealing during the dewetting stage, does allow for spatial patterning of the mask which translates into index patterning. However, laser raster scanning may include parameters that are hard to decouple during the laser patterning, such as laser power, beam size, hatch spacing, and scanning speed. Modifying any one of those parameters may require adjusting a number of the other parameters. The approach of the present disclosure provides the important and significant advantage of being able to rapidly stencil metasurfaces (i.e., spatially pattern) for mass production in a highly time and cost efficient process.

Mechanical loading can be done by raster scanning a suitable loading element over the nanostructured surface, or with a large-scale pre-made template, or by use of a platen, a roller, a stylus tip, or any other suitable implement. This enables fabrication of metaoptics with spatial variation of the index of refraction for generation of thin lenses, aberration correction, gratings, and flat 'freeform' optics. This is illustrated in FIG. 2a. FIG. 2a shows a substrate 10 having a spatially patterned nanostructured surface 12. The spatially patterned nanostructured surface 12 in this example has three distinctly different regions 12a, 12b and 12c produced by applying different vertical loads P1 and P2 to regions 12a and 12b. No load has been applied to the central region 12c. The different loads compress the nanostructure features vertically by differing magnitudes, which produces two distinctly different load induced spatial patterns in regions 12a and 12b. And both of these regions differ from region 12c as well. FIG. 2b further illustrates this, with the regions 12a and 12b represented by circular regions, and region 12c is a central circular region bounded by region 12b. While these regions 12a and 12b are circular in this example, they need not be circular, and may be oblong shaped, triangular, rectangular, square, or virtually any shape that one desires to create for the desired overall spatial pattern of the nanostructured surface. Furthermore, the entire nanostructured surface could be modified to have a single uniform spatial pattern, or more than three different spatial patterns may be employed.

The spatial patterns within regions 12a and 12b may be created by using a single template that has a non-uniform (e.g., stepped surface) such that a single applied load creates a greater degree of compression in region 12a than in region 12b. Optionally a suitable implement, for example a roller or stylus, may be traced in a circle or rastered over the metasurface while applying different loads at different areas within the regions 12a and 12b. The applied load may be abruptly changed to create two or more regions having distinctly different metasurface patterns, or the applied load may be gradually increased or decreased as the force application implement moves over various areas of the metasurface to create a gradually (or even abruptly) changing spatial pattern on the metasurface. Still further, two or more fully separate templates may be used with two different applied loads to create the spatial patterns within regions 12a and 12b. Still further, an implement with a small contact surface, such as a stylus, may be raster scanned back and forth over the entire nanostructured surface, with the applied force being modified, and/or temporarily fully removed, while the implement is passing over different regions, to thus apply different loads in different select regions. Those skilled in the art will appreciate that the above is not intended to be an exhaustive list of ways to apply a select, controlled force within different regions of the nanostructured metasurface, and the present disclosure is not limited to any one specific manner of applying selected loads to create a spatially patterned nanostructured surface. FIG. 2c shows images of regions 12a and 12c of the nanostructured substrate of FIG. 2a to show how the spatial pattern will look visually different after patterning is complete.

With brief reference to FIGS. 2d1 and 2d2, one example of a template 50 is shown for producing the nanostructured metasurface 12 of FIG. 2a. In this example the template 50 forms a planar element having a stepped lower surface and may be made of any suitable material, for example plastic, metal, etc. The template 50 forms a rigid structure suitable for applying the needed force to a metasurface to deform the nanostructure features. The template 50 includes an open central region 52, a first outer circumferential region 54, and a second circumferential region 56 within the region 54. When the template 50 is pressed down onto a metasurface, different loads are applied by regions 54 and 56, while no load is applied within the central region 52.

With brief reference to FIG. 3, a graph 80 is shown with a plurality of curves representing different applied loads from 0.05 N to 50 N, and the resulting metasurface reflectance variations following the application of each of these different loads. The loads were applied over a spot having a radius of about 200 μm. It will be noted that for larger loads, the nanostructured features compress more vertically and expand radially as well, becoming more "column-like", which changes the effective index of refraction of the metasurface.

While the force application component has been illustrated in one example as being a flat template 50 with a stepped lower surface, it will also be appreciated that the template could also have a non-flat shape, for example a hemispherical shape. Still further, while the application of force has been described herein as being normal to the nanostructured surface 12, it is also possible for the force to be applied at a slight angle to the nanostructured surface 12 (i.e., non-perpendicular to the nanostructured surface). The specific application and desired final shape of the component or optic being created with the nanostructured surface thereon may dictate in large part exactly the optimal manner of applying the force to the force application component (i.e., normal, non-perpendicular, etc.).

Figure 4:
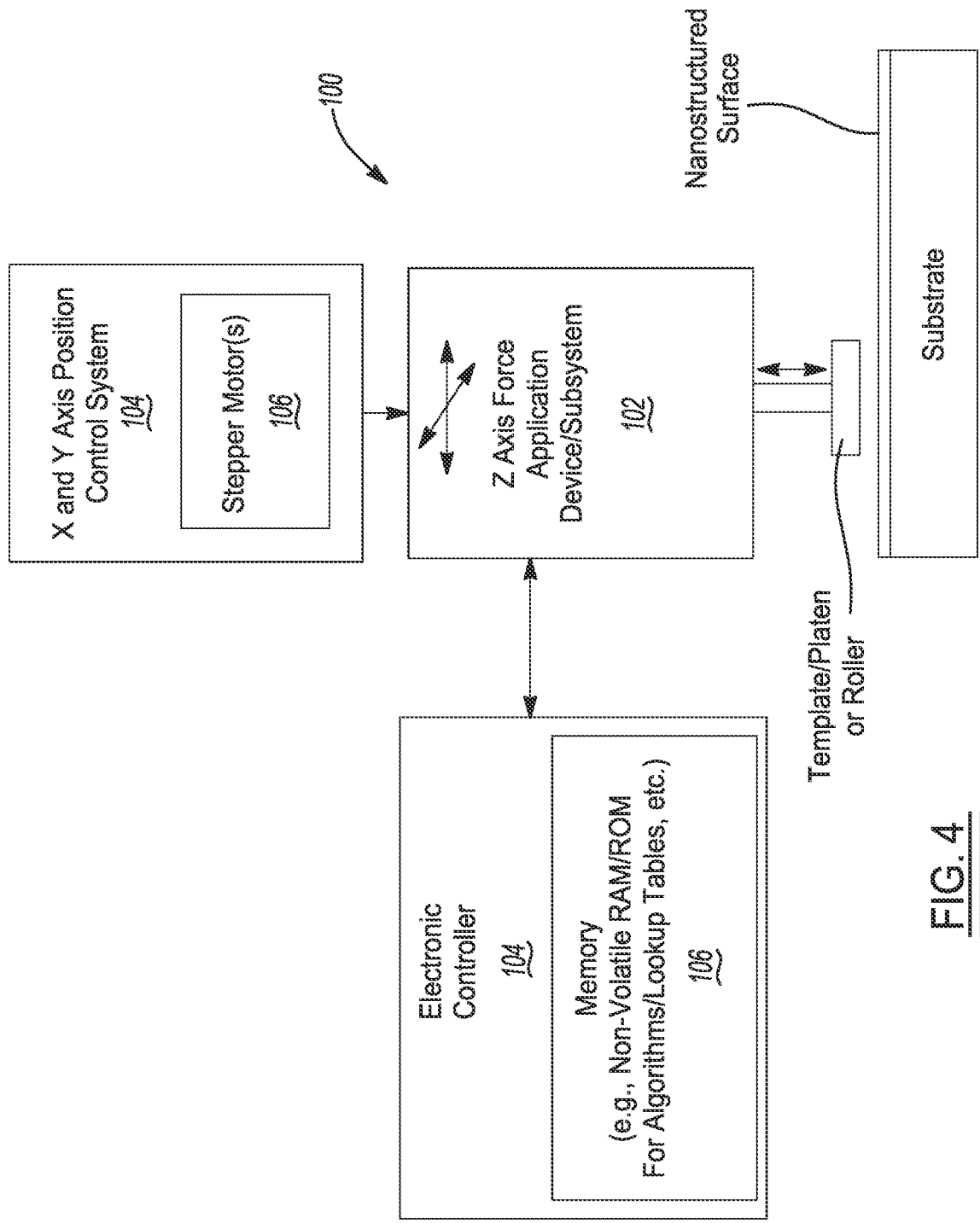
FIG. 4 is a high level block diagram of one example of a system that may be used to carry out the spatial patterning of a nanostructured metasurface in accordance with the present disclosure.

Referring to FIG. 4, one example of a system 100 for implementing the method of the present disclosure is shown. It will be appreciated that this is just one example, and a variety of different components may be used to apply the needed load(s) to various regions of a nanostructured surface. In this example the system 100 includes a force application subsystem 102 which moves an output element 102*a* in a linear manner. The output element 102*a* is coupled to a force application component 102*b*. The force application component 102*b* may be, merely by way of example and without limitation, a roller, a platen, a template, a stylus, etc. A position control subsystem 104 may be used to move the force application subsystem 102 in X and Y axes as needed via X and Y axis stepper motors 106 to scan and/or position the force application component 102*b* over the region of interest of a nanostructured surface 108*a* of a substrate 108. Alternatively, the substrate 108 could be moved by a suitable X/Y axis motion control system while the force application subsystem 102 is held stationary, and both of these implementations are contemplated by the present disclosure. In either of these implementations, the position control subsystem 104 may incorporate one or more suitable components (e.g., the stepper motor(s) 106) for precisely positioning the force application component 102*b* over the selected region of interest of the nanostructured surface 108*a*. A computer/electronic controller 110 may be used to help control the overall operation of the system 100. The computer/electronic controller 110 may include a suitable user input device 112 (e.g., keyboard, touchscreen, etc.) which enables the operator to input selections (forces, region information, etc.) to carry out applying specific loads to specific regions of the nanostructured surface 108*a*. A memory 114 (e.g., non-volatile RAM/ROM, etc.) may be used to store pertinent data, algorithms, look-up tables, matrices, etc.) which the computer/electronic controller 110 uses to carry out and monitor the process of applying the various selected loads to specific regions of the nanostructured surface 108*a*.

The application system 102 may involve one or more linear variable differential transducers for applying the desired force. Optionally, the force application component 102*b* may be constructed with a sufficient mass so that it is able to apply the desired force by itself when rested on the nanostructured surface 108*a*. In this event the force application subsystem 102 may not be necessary.

If look-up tables are used in the memory 114, the look-up tables may include information for the electronic controller 110 to use which correlates the proper force to be used for a given material that the nanostructured surface 108*a* is made from, and/or the specific type of force application component 102*b* being used to apply the force.

Figure 5:
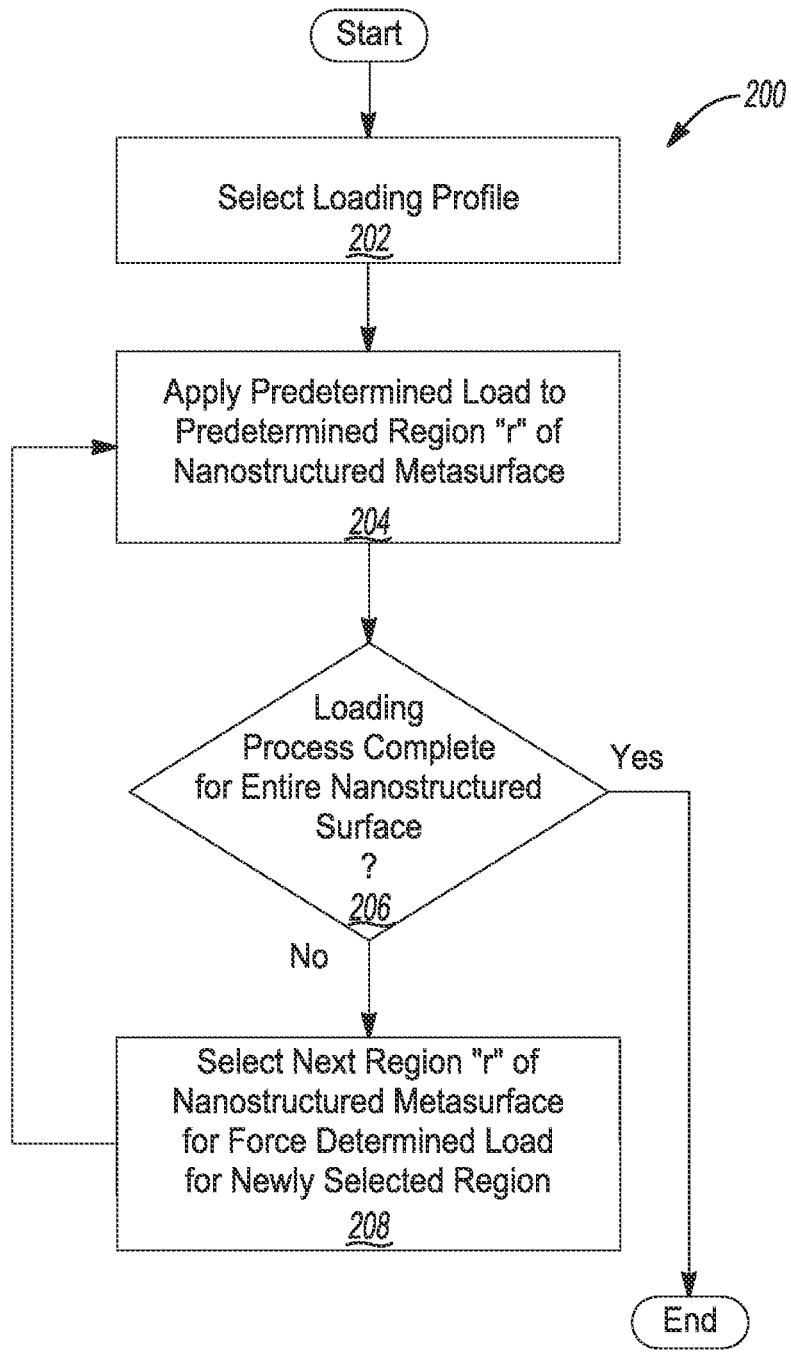
FIG. 5 is a high level flowchart of various operations that may be performed in carrying out the method of the present disclosure to spatially pattern a nanostructured surface.

Referring to FIG. 5, a flowchart 200 is shown illustrating a plurality of operations that may be performed in carrying out the method of the present disclosure. At operation 202 a loading profile is selected for a predetermined portion (or all) of the nanostructured surface. At operation 204 the predetermined load is applied using a selected implement, for example, a template, a roller, a platen, a stylus, or any other suitable component for applying the selected load. At operation 206 a check is made to determine if the loading process is complete for the entire nanostructured surface. If this check produces a "No" answer, then at operation 208 the operator selects the next region of the nanostructured surface where a new load is applied, and suitable data for implementing the new load is obtained. It will be appreciated that the new load may be the same as the previous load used, or it may differ from the previous load. Operation 204 is then repeated using the new load at the newly selected region of the nanostructured metasurface. The check at operation 206 is then repeated, and when this check produces a "Yes" answer the process is complete. If the answer obtained at operation 206 is a "No" answer, then operations 208, 204 and 206 are repeated until all the regions of the nanostructured surface have been treated with the user selected load(s).

The system 10 and method of the present disclosure thus enables patterning an index of refraction on a substrate, which in one example begins with fabrication of a spatially invariant metasurface, which can be done easily in a furnace for mass production. The system 10 and method of the present disclosure then involves applying a controlled, spatially varied mechanical loading to compress the nanostructured metasurface features vertically, which in some cases also expands the nanostructured metasurface features radially as well. The metasurface features made in accordance with the present disclosure, which were investigated in fused silica, compressed vertically, and no features were observed to fracture from the substrate. By the method described herein, the index of refraction of a nanostructured metasurface can be re-written on the metasurface, thus enabling index spatial patterning. This process allows rapid 'rewriting' of the index of refraction on large aperture optics to generate metaoptics that benefit from the monolithic substrate-engraved features for high laser durability.

While the present disclosure has focused on starting with, in one example, a spatially invariant nanostructured surface 108*a*, it will be appreciated that the nanostructured surface 108*a* may begin instead (i.e., prior to loading) as a spatially variant surface. In this instance the nanostructured surface may have two or more regions which have differing nanostructure features (e.g., slightly different heights, shapes, etc.), which are then further patterned by the above-described, controlled loading process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for producing a patterned nanostructured surface on a component from a pre-existing, nanostructured surface with a first spatial feature distribution on the component, the system comprising:
   a force application element configured to apply a force to the pre-existing, nanostructured surface with the first spatial feature distribution; and
   a force application control subsystem configured to control elevational movement of the force application element along a first axis of movement into and out of contact with the pre-existing, nanostructured surface with the first spatial feature distribution to apply a predetermined load to the pre-existing, nanostructured surface with the first spatial feature distribution sufficient to modify the pre-existing nanostructured surface to create the patterned nanostructured surface.

2. The system of claim 1, wherein the force application control subsystem controls the force application element to create the patterned nanostructured surface as a spatially patterned nanostructured surface.

3. The system of claim 1, further comprising a position control subsystem for moving the force application element in at least one of X and Y axes orthogonal to the first axis of movement of the force application element.

4. The system of claim 1, wherein the force application element comprises a template having a surface shaped to impress a desired spatial pattern onto the component's pre-existing nanostructured surface with the first spatial feature distribution.

5. The system of claim 4, wherein the surface of the template comprises a stepped surface which applies different loads to different regions of the pre-existing nanostructured surface with the first spatial feature distribution.

6. The system of claim 1, wherein the force application element comprises a roller.

7. The system of claim 1, wherein the force application element comprises a platen.

8. The system of claim 1, wherein the force application element applies the predetermined load normal to the pre-existing nanostructured surface.

9. The system of claim 1, further comprising an electronic control system configured to assist in at least selecting a specific one of a desired number of loads to be applied by the force application element.

10. The system of claim 1, wherein the force application element has a mass selected to apply the desired load to the pre-existing nanostructured surface with the first spatial feature distribution when resting on the pre-existing nanostructured surface with the first spatial feature distribution.

11. The system of claim 9, further comprising a memory for storing information used to select the specific one of the desired number of loads to be applied.

12. A system for producing a patterned nanostructured surface on a component from a pre-existing, nanostructured surface with an initial spatial feature distribution on the component, the system comprising:
- a force application element configured to apply a force to the pre-existing, nanostructured surface; and
- a force application subsystem configured to control elevational movement of the force application element along a first axis of movement into and out of contact with the pre-existing, nanostructured surface to apply a predetermined load to the pre-existing, nanostructured surface sufficient to modify the pre-existing, nanostructured surface to create the patterned nanostructured surface; and
- a position control subsystem for moving at least one of the component or the force application element along at least one of X or Y axes while the force application element is applying the predetermined load to the pre-existing, nanostructured surface.

13. The system of claim 12, wherein the position control subsystem controls movement of at least one of the component or the force application element in both of the X and Y axes.

14. The system of claim 12, further comprising an electronic controller configured to control at least one of the force application subsystem or the position control subsystem.

15. The system of claim 12, wherein the force application element comprises a linearly movable template.

16. The system of claim 15, wherein the linearly movable template has a lower surface with a stepped contour.

17. The system of claim 12, wherein the force application element comprises at least one of a roller, a platen or a stylus.

18. A method for producing a patterned nanostructured surface on a component from a pre-existing, nanostructured surface with an initial spatial feature distribution on the component, the method comprising:
- positioning a force application element over the pre-existing, nanostructured surface;
- moving the force application element along a first axis into contact with the pre-existing, nanostructured surface; and
- continuing to use the force application element to apply a predetermined load to the pre-existing, nanostructured surface sufficient to modify the pre-existing nanostructured surface to create the patterned nanostructured surface.

19. The method of claim 18, wherein moving the force application element into contact with the pre-existing, nanostructured surface comprises moving a template linearly into contact with the pre-existing, nanostructured surface with the initial spatial feature distribution.

20. The method of claim 18, wherein moving the force application element into contact with the pre-existing, nanostructured surface comprises moving the force application element in at least one of X or Y axes extending perpendicular to the first axis, while applying the predetermined load.

* * * * *